US007647295B2

(12) United States Patent
Bottomley et al.

(10) Patent No.: US 7,647,295 B2
(45) Date of Patent: Jan. 12, 2010

(54) METHOD, APPARATUS, COMPUTER PROGRAM, AND COMPUTER PROGRAM PRODUCT FOR MANAGING THE DURABILITY OF A PLURALIY OF TRANSACTIONS

(75) Inventors: Gareth Ian Bottomley, Southampton (GB); Brian Trevor DePradine, Winchester (GB); Andrew John Schofield, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 11/260,076

(22) Filed: Oct. 27, 2005

(65) Prior Publication Data
US 2006/0101049 A1 May 11, 2006

(30) Foreign Application Priority Data
Nov. 5, 2004 (GB) ................. 0424442.2

(51) Int. Cl.
*G06F 7/00* (2006.01)
*G06F 17/30* (2006.01)
*G06F 17/00* (2006.01)
*G06F 12/00* (2006.01)
(52) U.S. Cl. .............. 707/2; 707/10; 707/101; 707/202
(58) Field of Classification Search ............. 707/2, 707/10, 101, 202
See application file for complete search history.

(56) References Cited

U.S. PATENT DOCUMENTS

| 5,553,280 | A * | 9/1996 | Fortier | 707/10 |
|---|---|---|---|---|
| 6,044,370 | A * | 3/2000 | Anfindsen | 707/4 |
| 6,532,211 | B1 * | 3/2003 | Rathonyi et al. | 370/230 |
| 6,714,935 | B1 * | 3/2004 | Delo | 707/101 |
| 6,826,665 | B1 * | 11/2004 | Nambu | 711/162 |
| 6,848,109 | B1 * | 1/2005 | Kuhn | 719/315 |
| 6,856,993 | B1 * | 2/2005 | Verma et al. | 707/101 |
| 6,928,580 | B2 * | 8/2005 | Pedone et al. | 714/7 |
| 7,072,879 | B2 * | 7/2006 | Soemo et al. | 707/1 |
| 2002/0138376 | A1 * | 9/2002 | Hinkle | 705/30 |
| 2003/0065913 | A1 * | 4/2003 | Cepulis et al. | 713/1 |

(Continued)

FOREIGN PATENT DOCUMENTS

WO WO 9420903 A1 * 9/1994

OTHER PUBLICATIONS

Vishnuvajjala, R. Subramanian, S. Tsai, W. Mojdehbakhsh, R. Elliot, L. "Flow Analysis for Concurrent, Reactive, Real-Time Systems," IEEE, 1997, http://ieeexplore.ieee.org/iel3/4888/13475/00618591.pdf.*

(Continued)

*Primary Examiner*—James Trujillo
*Assistant Examiner*—Bruce M Moser
(74) *Attorney, Agent, or Firm*—Hoffman & Warnick LLP

(57) ABSTRACT

Method, apparatus, computer program, and computer program product for managing the durability of a plurality of transactions, each transaction including a plurality of operations, each operation for applying to a data item, each operation having a reliability level associated therewith. Each transaction is divided into one or more sub-transactions based upon reliability level of the operations. Sub-transactions are then dispatched to a persistence manager for execution against a persistent store.

12 Claims, 4 Drawing Sheets

U.S. PATENT DOCUMENTS

2004/0039742 A1* 2/2004 Barsness et al. .............. 707/10
2004/0162836 A1* 8/2004 Aronoff et al. .............. 707/100

OTHER PUBLICATIONS

Singh. Huhns. "Database Integration," 1998, www.cse.sc.edu/research/cit/Courses/EECE818/CIS3dbIntegration.ppt.*

Unknown, "Asynchronous Commit," www.ip.com00031629D.

Unknown, "SuperSpeed," www.raxco.be/pages/info/SuperSpeedCache/supercache.htm.

Webber, Jim, "Future Directions for Web Transactions," HP Presentation.

Unknown, "OASIS, Business Transaction Protocol," version 1.0.0.4, BTP 1.1 Working Draft 04 Oct. 26, 2004.

Unknown, "PTF Memo for: IBM WebSphere MQ for AIX Version 5.3 Service Level 5.3.0.9 (Fix Pack CSD09)," International Business Machines Corporation.

* cited by examiner

| ID | NAME | RELIABILITY |
|----|------|-------------|
| A | FRED | ALPHA |
| B | JOHN | ALPHA |
| C | DEPT1 | ALPHA |
| X | MARK | BETA |
| Y | PAUL | BETA |
| Z | DEPT2 | BETA |

| UPDATE A | DELETE B | DELETE X | UPDATE Y |
|----------|----------|----------|----------|

METHOD, APPARATUS, COMPUTER PROGRAM, AND COMPUTER PROGRAM PRODUCT FOR MANAGING THE DURABILITY OF A PLURALIY OF TRANSACTIONS

FIELD OF THE INVENTION

The present invention relates to transactional data processing systems such as messaging and database systems, and more particularly to transactional systems which persist data in order to guarantee data integrity in the event of, for example, a system failure.

BACKGROUND OF THE INVENTION

Traditional transaction-processing software enforces a very rigid set of properties which provide the transactional behavior. These are known as the ACID properties, referring to the initial letters of the four principles of Atomicity, Consistency, Isolation, and Durability.

FIG. 1 illustrates the components of a typical transactional data processing system in accordance with the prior art. An application 10 issues a request to data processing system 20. Data Manager 30 receives the request and maps the request into operations (data 30) necessary to achieve the application's initial request. In a messaging system, such operations may involve PUTs to a queue and GETs from a queue. In a database system, the operations may comprise inserts, updates, and deletes of rows in a table.

Each operation will, at some point in time, be written by the persistence manager 60 to persistent store 70. A transaction comprises a set of operations. When the transaction commits, the persistence manager must ensure that all of the operations comprising the transaction are stably recorded or "hardened" to the persistent store. This means that the system can guarantee to the application that it is possible to recover that set of operations in the event of a system failure. In other words, whilst the persistence manager is permitted a degree of flexibility about when to harden the persistence records describing the operations comprising a transaction, all such operations must be on disk by the time the commit is hardened. At this point, the data processing system 20 returns control to the application 10 and processing can continue. In this way ACID properties for each transaction processed by the data processing system can be guaranteed. The provision of ACID guarantees for each transaction can however slow system performance, especially when data items being processed by the system are short-lived and throughput is high. Thus, particularly in the sphere of commercial messaging, it is sometimes acceptable to relax the ACID properties to some extent for performance reasons, such as throughput and concurrency.

IBM WebSphere MQ products are able to denote certain data items (messages) as persistent, and others as non-persistent. The persistence manager and its persistence store are used to guarantee those data items classified as persistent. A problem arises where a system permits transactions including operations spanning multiple levels of reliability over and above persistent and non-persistent. In other words, a system may permit varying degrees of persistence. It is known, for example, to denote a message as semi-persistent. This means that such a message may be lost upon system failure but not at controlled shutdown. A co-pending patent application Ser. No. 11/260,857 to the present assignee also deals with this subject.

SUMMARY OF THE INVENTION

According to a first aspect, there is provided a method for managing the durability of a plurality of transactions, each transaction including a plurality of operations, each operation for applying to a data item, each operation having a reliability level associated therewith, the method comprising: analyzing each transaction to determine the operations involved in the transaction; determining the reliability level associated with each operation; dividing each transaction into one or more sub-transactions based the reliability level associated with each operation; and dispatching each sub-transaction to a persistence manager for execution against a persistent store.

In one embodiment, each data item has an associated reliability level, and the reliability level of each data item being operated upon in a transaction is determined. Thus an operation may have a reliability level associated therewith as a result of the data item being operated upon.

In one embodiment, a plurality of transactions are analyzed and sub-transactions are created based on this analysis such that at least one sub-transaction comprises operations from a first parent transaction and a second parent transaction. In other words, it is possible to create sub-transactions comprising operations spanning multiple transactions.

According to a second aspect, there is provided apparatus for managing the durability of a plurality of transactions, each transaction including a plurality of operations, each operation for applying to a data item, each operation having a reliability level associated therewith, the apparatus comprising: a first analyzing component for analyzing each transaction to determine the operations involved in the transaction; a determining component for determining the reliability level associated with each operation; a dividing component for dividing each transaction into one or more sub-transactions based the reliability level associated with each operation; and a dispatcher for dispatching each sub-transaction to a persistence manager for execution against a persistent store.

According to a third aspect, there is provided a computer program for managing the durability of a plurality of transactions, each transaction including a plurality of operations, each operation for applying to a data item, each operation having a reliability level associated therewith, the computer program comprising program code means adapted to perform the following method when the program is run on a computer: analyzing each transaction to determine the operations involved in the transaction; determining the reliability level associated with each operation; dividing each transaction into one or more sub-transactions based the reliability level associated with each operation; and dispatching each sub-transaction to a persistence manager for execution against a persistent store.

According to a fourth aspect, there is provided a computer program product for managing the durability of a plurality of transactions, each transaction including a plurality of operations, each operation for applying to a data item, each operation having a reliability level associated therewith, the computer program product comprising computer readable program code tangible embedded in a computer readable medium, the computer program product comprising computer readable program code configured to perform the following method when the program is executed on a computer: analyzing each transaction to determine the operations involved in the transaction; determining the reliability level associated with each operation; dividing each transaction into one or more sub-transactions based on the reliability level associated with each operation; and dispatching each sub-transaction to a persistence manager for execution against a persistent store.

BRIEF DESCRIPTION OF THE DRAWINGS

A preferred embodiment of the present invention will now be described, by way of example only, and with reference to the following drawings, wherein.

DETAILED DESCRIPTION

In accordance with a preferred embodiment, there is provided a technique for managing transactions which comprise operations on multiple data items spanning more than one reliability level.

Figure 1:
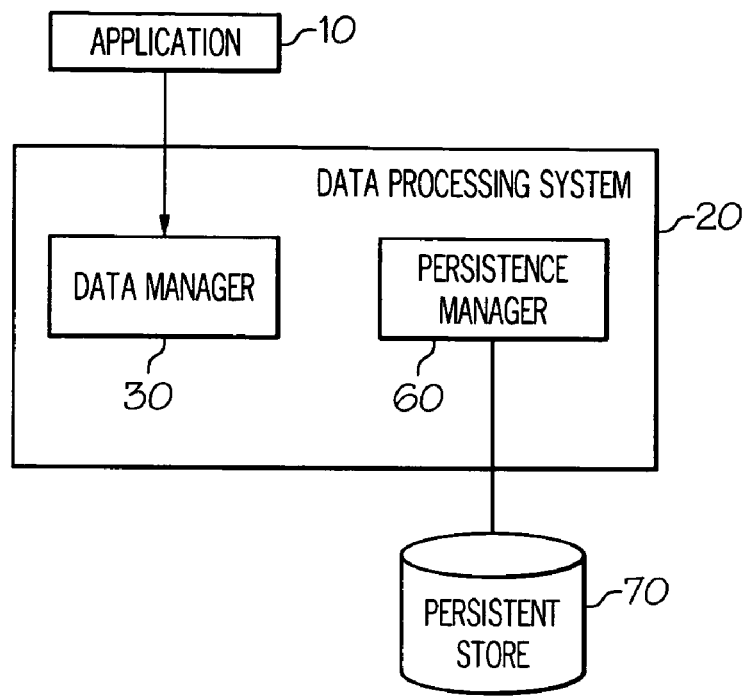
FIG. 1 illustrates the components of a typical transactional data processing system.
Figure 2:
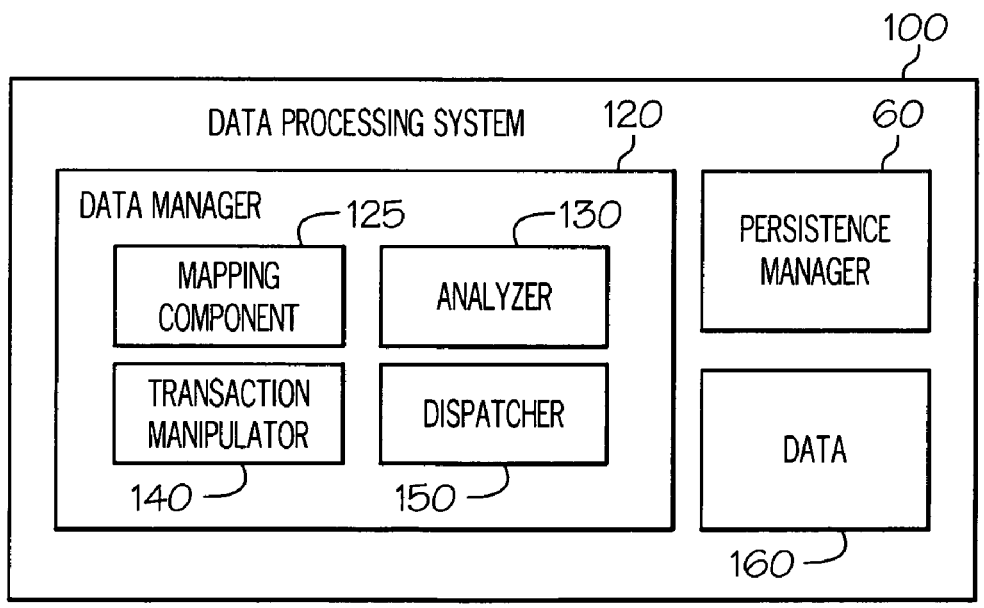
FIG. 2 shows the components of the present invention in accordance with a preferred embodiment.
Figure 3:
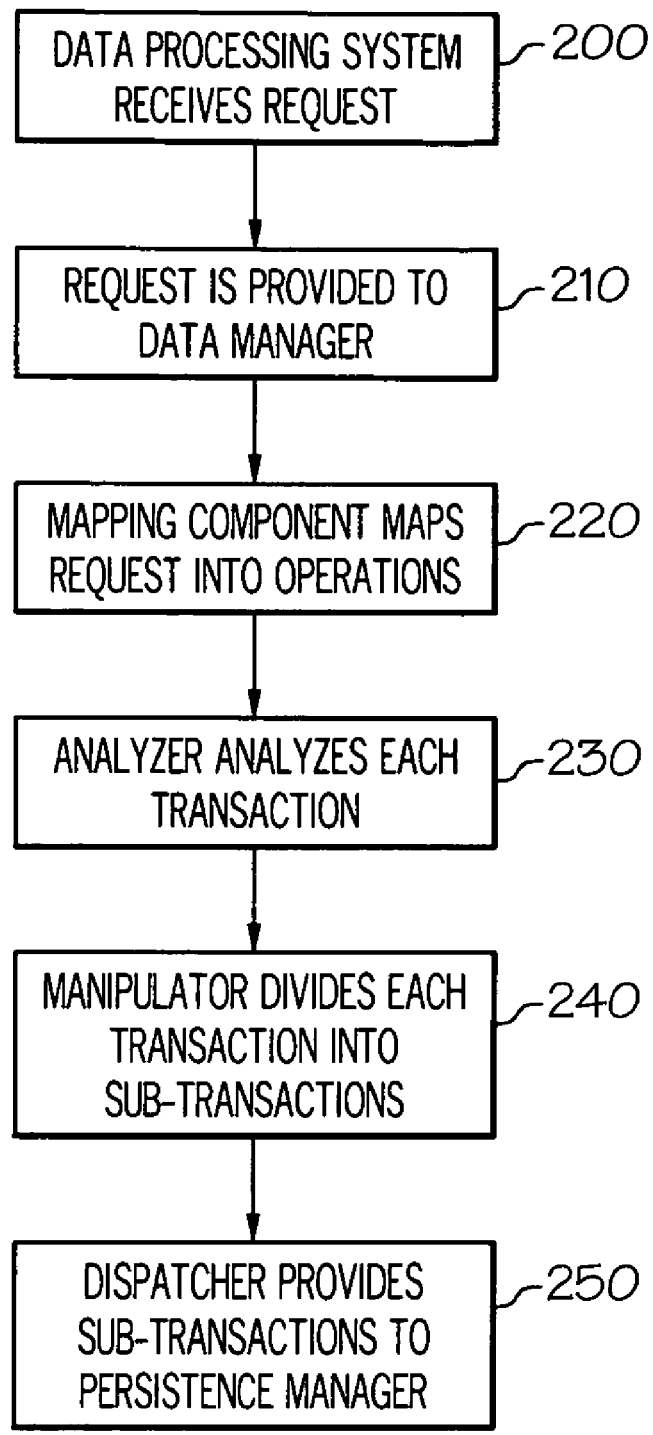
FIG. 3 is a flow chart of the processing of the present invention in accordance with a preferred embodiment.

The functionality to achieve this may be built into a data manager. FIG. 2 shows a data processing system, including the data manager, in accordance with a preferred embodiment of the present invention. FIG. 3 illustrates the processing of the present invention in accordance with a preferred embodiment. FIGS. 2 and 3 should be read in conjunction with one another.

Data processing system 100 receives a request from an application at step 200. The request is passed to data manager 120 (step 210), and mapping component 125 maps the request into the operations necessary to achieve the application's request (step 220). Each transaction is then passed to analyzer component 130. Analyzer component 130 analyses each transaction to determine the data items (data 160) being operated on and the reliability levels associated with each such data item (step 230). Having performed the necessary analysis, this information is passed to transaction manipulator component 140 which divides each transaction into sub-transactions based on the reliability level of the data items involved (step 240). Such subtransactions are then passed to dispatcher 150, which passes these to persistence manager 60 (step 250).

The reliability level associated with a sub-transaction determines the nature of interaction by the persistence manager 60 with the persistent store. Persistence Manager 60 has knowledge of the interaction necessary with the persistent store to achieve each reliability level. This is the subject of the commonly assigned, co-pending patent application Ser. No. 11/260,857.

Figures 4A, 4B, 4C:
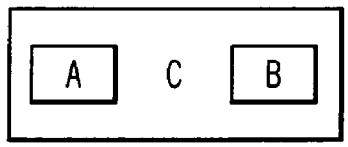
FIG. 4a exemplifies the data being operated upon.
FIG. 4b illustrates example operations on the data shown in FIG. 4b.
FIG. 4c illustrates the relationship between a plurality of data items.

FIG. 4a exemplifies the data 160 being operated upon. Each data item preferably has a number of attributes associated therewith: an id, a name, and a reliability level.

FIG. 4b exemplifies operations on the data items of FIG. 4a. As shown in this figure, data items A and Y are to be updated and items B and X are to be deleted.

Figure 5:
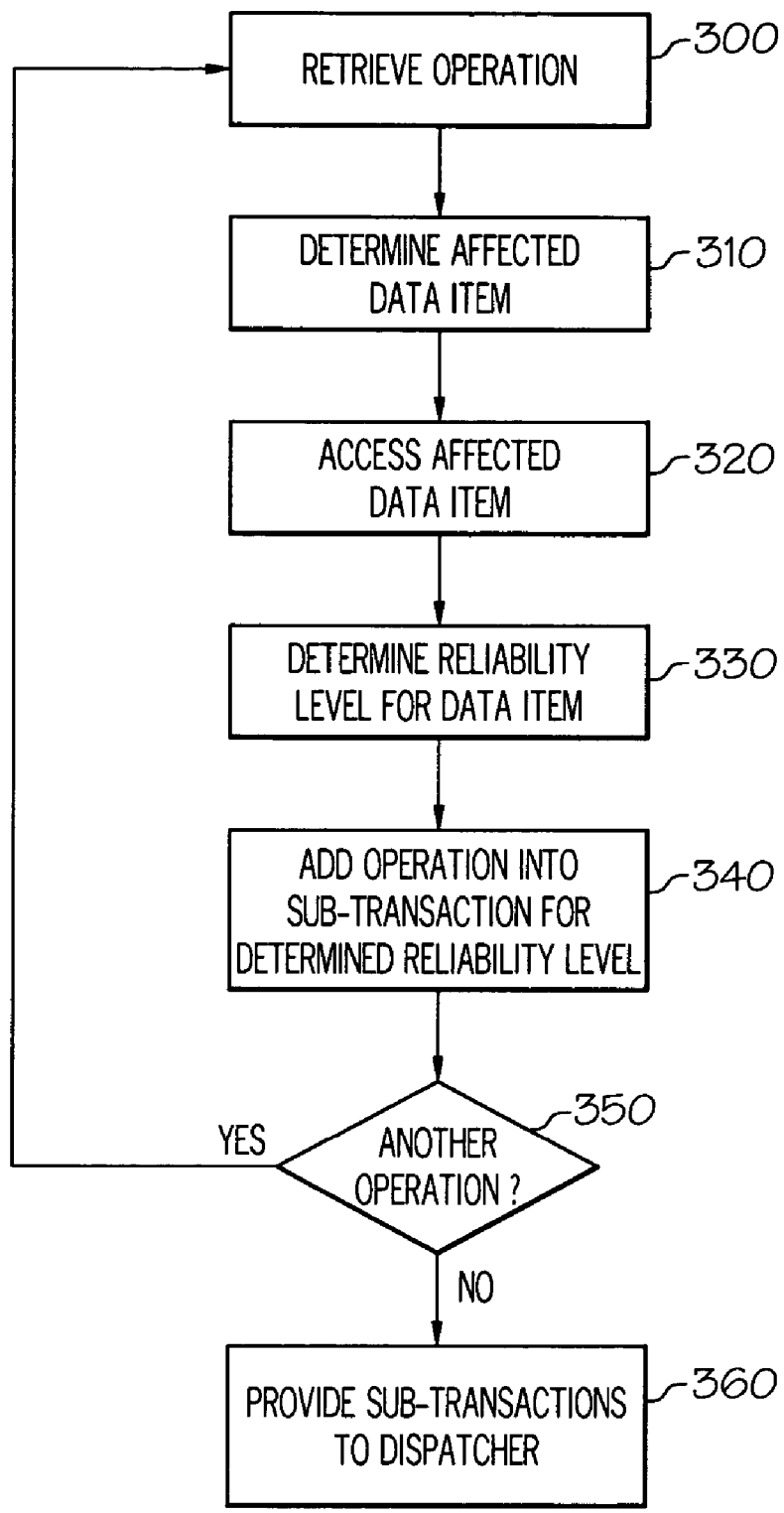
FIG. 5 illustrates the processing of the present invention in more detail and in accordance with a preferred embodiment.

FIG. 5 illustrates the processing of the analyzer and data manipulator components in accordance with a preferred embodiment of the present invention.

Each operation within a transaction is retrieved (step 300). The data item affected by the operation is determined (step 310), and the data item is accessed (step 320). The reliability level associated with the data item is then determined from the reliability attribute associated with the data item (step 330).

It is then determined whether a sub-transaction already exists for the determined reliability level. If not, then a new sub-transaction is created; else, the operation is placed into the already existing sub-transaction (step 340). It is then determined whether another operation exists in the main transaction (step 350). If so, then the whole process loops around again (step 300). Otherwise, sub-transactions are provided to dispatcher 150 (step 360).

For each subtransaction, the dispatcher interacts with the persistence manager 60 in accordance with the subtransaction's reliability level. For example, a fully ACID reliability level requires that the interactions are performed synchronously with regard to the application's transaction. A less rigorous reliability level might permit the interactions to be performed asynchronously after a small delay, perhaps combining the interactions for such subtransactions into larger units to improve efficiency.

Note that, in another embodiment there is an empty sub-transaction created for each possible reliability level in the data processing system. Empty sub-transactions are then added to as appropriate. When a sub-transaction is provided to the dispatcher, a new empty sub-transaction is created ready to receive another request from an application. Note that it may be necessary to provide referential integrity between data items. For example, data items A and B may not be able to exist without C (e.g. employees (A, B) must belong to a department (C)). This is illustrated by FIG. 4c. In this case, if operations are to be performed on all of A, B and C, then these three data items should be grouped into the same transaction. Such relationships between data items may be indicated as an another attribute of the data. This description presupposes that the containing data item (e.g. C) is either at the same reliability level or requires a stricter level of reliability. In other words, if A and B survive a system failure, C must not be lost.

To summarize, a transaction comprising operations on multiple recoverable data items spanning more than one reliability level is divided into separately recoverable sub-transactions, one for each reliability level. In the absence of a failure, the runtime behavior is transactional in the conventional sense. In the presence of a failure immediately following the commit or rollback of a user's transaction, it is possible that the results of the transaction are split when the effects of the less reliable sub-transactions are not recorded stably before the failure.

Note, that the process of sub-dividing based on reliability level could be performed across a plurality of transactions rather than just the one. Further note that the present invention has been described in terms of a data item having a reliability level associated therewith. This does not necessarily have to be the case. For example, it may be the operations themselves that have a reliability directly associated with them. Note that the present invention is applicable to transactional systems such as messaging systems and database systems.

We claim:

1. A method, executed on a computer device, for managing the durability of a plurality of transactions, each transaction including a plurality of operations, each operation for applying to a data item, each operation having a reliability level associated therewith, a total number of reliability levels being at least three, the method comprising:

analyzing each transaction to determine operations involved in the transaction;

determining a reliability level associated with each operation, at least one operation in the transaction having a reliability level that differs from a reliability level of at least one other operation in the transaction;

dividing each transaction into at least one sub-transaction based on the reliability level associated with each operation, every sub-transaction having all operations in the transaction that share a common reliability level, wherein a particular reliability level indicates a level of persistence necessary for operations associated therewith; and managing the durability of the plurality of transactions by dispatching each sub-transaction to a persistence manager for execution against a persistent store.

2. The method of claim 1, wherein each data item has an associated reliability level and wherein determining the reliability level associated with each operation comprises determining the reliability level of each data item being operated upon.

3. The method of claim 1, further comprising: analyzing a plurality of transactions; and creating subtransactions based on the analysis of the plurality of transactions such that at least one sub-transaction comprises all operations from a first parent transaction and a second parent transaction that share a common reliability level.

4. Apparatus for managing the durability of a plurality of transactions, each transaction including a plurality of operations, each operation for applying to a data item, each operation having a reliability level associated therewith, a total number of reliability levels being at least three, the apparatus comprising:

at least one computer device;

a first analyzing component for analyzing each transaction to determine operations involved in the transaction;

a determining component for determining a reliability level associated with each operation, at least one operation in the transaction having a reliability level that differs from a reliability level of at least one other operation in the transaction;

a dividing component for dividing each transaction into at least one sub-transaction based on the reliability level associated with each operation, every sub-transaction having all operations in the transaction that share a common reliability level, wherein a particular reliability level indicates a level of persistence necessary for operations associated therewith;

and a dispatcher for managing the durability of the plurality of transactions by dispatching each sub-transaction to a persistence manager for execution against a persistent store.

5. The apparatus of claim 4, wherein each data item has an associated reliability level and wherein the determining component comprises another determining component for determining the reliability level of the each data item being operated upon.

6. The apparatus of claim 4, comprising: a second analyzing component for analyzing a plurality of transactions; and a creator component for creating sub-transactions based on the analysis of the plurality of transactions, such that at least one sub-transaction comprises all operations from a first parent transaction and a second parent transaction that share a common reliability level.

7. A computer readable storage medium having a computer program for managing the durability of a plurality of transactions stored thereon, each transaction including a plurality of operations, each operation for applying to a data item, each operation having a reliability level associated therewith, a total number of reliability levels being at least three, the computer program comprising program code means that performs the following method when said program is run on a computer:

analyzing each transaction to determine operations involved in the transaction;

determining a reliability level, associated with each operation, at least one operation in the transaction having a reliability level that differs from a reliability level of at least one other operation in the transaction;

dividing each transaction into at least one sub-transaction based on the reliability level associated with each operation, every sub-transaction having all operations in the transaction that share a common reliability level, wherein a particular reliability level indicates a level of persistence necessary for operations associated therewith; and managing the durability of the plurality of transactions by dispatching each sub-transaction to a persistence manager for execution against a persistent store.

8. The computer program of claim 7, wherein each data item has an associated reliability level, and wherein determining the reliability level associated with each operation comprises determining the reliability level of each data item being operated upon.

9. The computer program of claim 7, wherein the program code means further performs the following when said program is run on a computer:

analyzing a plurality of transactions; and creating sub-transactions based on the analysis of the plurality of transactions, such that at least one sub-transaction comprises all operations from a first parent transaction and a second parent transaction that share a common reliability level.

10. A computer program product for managing the durability of a plurality of transactions, each transaction including a plurality of operations, each operation for applying to a data item, each operation having a reliability level associated therewith, a total number of reliability levels being at least three, the computer program product comprising a computer readable medium having computer readable program code tangibly embedded therein, the computer readable program code comprising:

computer readable program code configured to analyze each transaction to determine operations involved in the transaction;

computer readable program code configured to determine the reliability level associated with each operation, at least one operation in the transaction having a reliability level that differs from a reliability level of at least one other operation in the transaction;

computer readable program code configured to divide each transaction into one or more sub-transactions based on the reliability level associated with each operation, every sub-transaction having all operations in the transaction that share a common reliability level, wherein a particular reliability level indicates a level of persistence necessary for operations associated therewith; and computer readable program code configured to manage the durability of transactions by dispatching each sub-transaction to a persistence manager for execution against a persistent store.

11. The computer program product of claim 10, wherein each data item has an associated reliability level, and wherein the computer readable program code configured to determine the reliability level associated with each operation comprises computer readable program code configured to determine the reliability level of the each data item being operated upon.

12. The computer program product of claim 10, wherein the computer readable program code further comprises: computer readable program code configured to analyze a plurality of transactions; and computer readable program code configured to create sub-transactions based on the analysis of the plurality of transactions, such that at least one sub-transaction comprises all operations from a first parent transaction and a second parent transaction that share a common reliability level.

* * * * *